Figure 1:
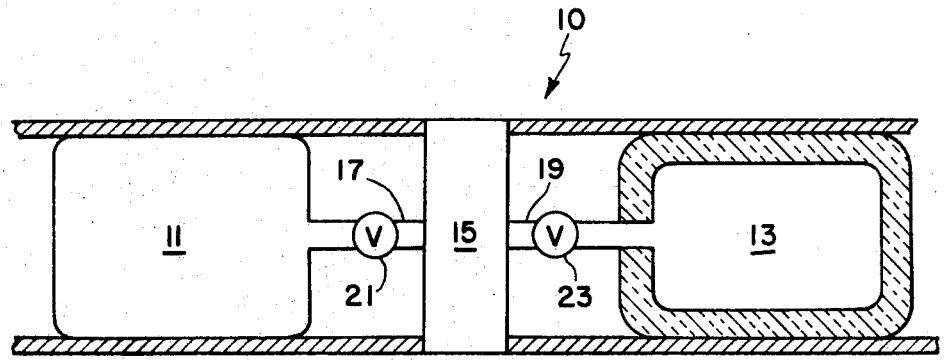

United States Patent [19]

Paine et al.

[11] 3,751,913
[45] Aug. 14, 1973

[54] BARIUM RELEASE SYSTEM

[76] Inventors: Thomas O. Paine, Administrator of the National Aeronautics and Space Administration with respect to an invention of; Beverley W. Lewis, Hampton; Charles S. Stokes, Willow Grove, both of Va.; Edward W. Smith, Exton; William J. Murphy, King of Prussia, both of Pa.

[22] Filed: July 31, 1970

[21] Appl. No.: 59,892

[52] U.S. Cl.......................... 60/215, 149/1, 149/36, 252/305, 252/301.4
[51] Int. Cl............................................. C06d 5/06
[58] Field of Search................... 60/211, 214, 215; 252/305, 301.4 R; 149/36, 1

[56] References Cited

UNITED STATES PATENTS 3,658,609  4/1972  Lum et al. ............................ 149/36

Primary Examiner—Benjamin R. Padgett
Attorney—John R. Manning, Howard J. Osborn and Wallace J. Nelson

[57] ABSTRACT

A chemical system for releasing a good yield of free barium ($Ba°$) atoms and barium ions ($Ba^+$) to create ion clouds in the upper atmosphere and interplanetary space for the study of the geophysical properties of the medium.

2 Claims, 2 Drawing Figures

Patented Aug. 14, 1973 3,751,913

INVENTORS
BEVERLEY W. LEWIS
CHARLES S. STOKES
EDWARD W. SMITH
WILLIAM J. MURPHY

BY *Howard J. Osborn*
*Wallace J. Nelson* ATTORNEYS

BARIUM RELEASE SYSTEM

ORIGIN OF THE DISCLOSURE

The invention described herein was made in the performance of work under a NASA contract and is subject to the provisions of section 305 of the National Aeronautics and Space Act of 1958, Public Law 85-568 (72 Stat. 435; 42 USC 2457).

This invention relates generally to a chemical release system and relates in particular to a system for releasing barium in the vapor phase so that it can be ionized by solar radiation and also be excited to emit resonance radiation in the visible range. The ionized luminous cloud of barium then becomes a visible indication of magnetic and electric characteristics in space and allows determination of these properties over relatively large areas of space at a given time compared to rocket borne or orbiting instruments. For example, a geomagnetic field line could be illuminated by the present invention from pole-to-pole.

Presently, barium release systems are used to create ion clouds in the upper atmosphere for the study of geophysical properties of the atmosphere. These known systems utilize a solid chemical system using a thermite mixture of barium and copper oxide as the heat-producing reaction and an excess of barium to be vaporized. This system is launched by a suitable rocket and, at a predetermined time, the ingredients are ignited and released from a canister through a burst diaphragm and nozzle. The resulting barium cloud gives a brilliant color that can be observed and studied from earth to give indications of wind currents and the like. This known system of barium release has proved effective but is inherently of low efficiency in producing barium vapor yielding, in practice, only from 2 to 4 percent of the total chemical weight when actually up to 48 percent is available. In addition, the barium-copper oxide mixture is a fire hazard when mixing and pressing into the canister and must be done under inert atmospheric conditions which proves time-consuming and costly in operation. Also, little, if any, ionization takes place in this known system due to the initial heat generating reaction.

It is therefore an object of the present invention to provide a new and novel barium release system for atmospheric and space studies.

Another object of the present invention is a system for releasing barium in the vapor phase so that it can be ionized by solar radiation and excited to emit resonance radiation in the visible range.

Another object of the present invention is a novel chemical mixture for releasing a good yield of free atoms and barium ions.

A further object of the present invention is a binary liquid hypergolic chemical release system in which barium is formed as a vapor at the time of release.

The foregoing and other objects are attained in one aspect of the present invention by providing a liquid fuel, in which barium salts are dissolved, and a high energy oxidizer which spontaneously ignites the fuel on contact. The barium release is accomplished by impinging fuel and oxidizer jets in an open-ended combustion chamber which expels the reaction product gases or plasma and which includes the desired barium neutral atoms (Ba°) and barium ions (Ba⁺) as individual species.

Figure 2:
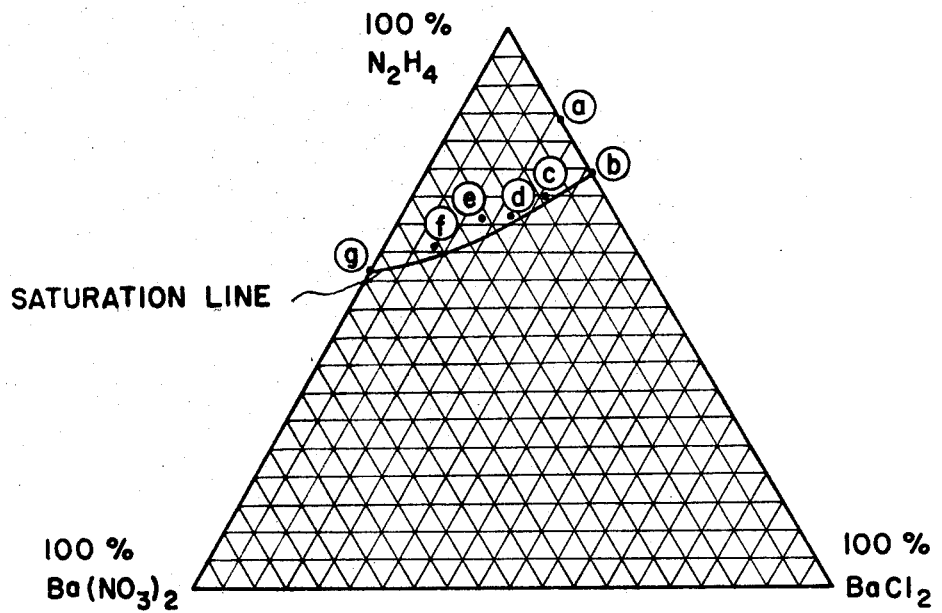

A more complete appreciation of the invention and many of the attendant advantages thereof will be readily apparent as the same becomes better understood by reference to the following detailed description when considered in connection with the accompanying drawings wherein:

FIG. 1 is a schematic representation of the fuel and oxidizer tanks connected to an open-ended combustion chamber in a launch rocket for release of barium according to the present invention; and FIG. 2 is a plot of triangular coordinates which defines the barium nitrate-barium chloride-hydrazine mixtures of the present invention.

Referring now to the drawings and more particularly to FIG. 1, there is shown a segment of a suitable carrier vehicle 10, such for example a rocket motor. Vehicle 10 is employed to carry fuel tank 11, insulated oxidizer tank 13 and combustion chamber 15, along with the necessary instrumentation, from earth into the upper atmosphere or into interplanetary space. Fuel tank 11 is in fluid connection with combustion chamber 15 and oxidizer tank 13 is in fluid connection with combustion chamber 15 by way of respective conduits 17 and 19. A pair of valves 21 and 23 are disposed within the respective conduits 17 and 19. Valves 21 and 23 are adapted to be selectively and simultaneously opened by a suitable battery-powered timing mechanism, radio signal, or the like, to release the pressurized fuel and oxidizer from tanks 11 and 13. The fuel and oxidizer then flow through conduits 17 and 19 and impinge upon each other through a centrally positioned manifold and suitable jets (not shown) in combustion chamber 15 where spontaneous ignition occurs. The reaction products are then expelled through the open ends of combustion chamber 15 as plasma which includes the desired barium neutral atoms and barium ions as individual species.

The fuel utilized in fuel tank 11 is either hydrazine ($N_2H_4$) or liquid ammonia ($NH_3$) while the oxidizer employed is selected from the group consisting of liquid fluorine ($F_2$), chlorine trifluoride ($ClF_3$) and oxygen difluoride ($OF_2$). When using hydrazine as the fuel, barium may be dissolved therein as barium chloride, $BaCl_2$, or barium nitrate, $Ba(NO_3)_2$, or a combination of the two. When using liquid ammonia as the fuel, barium metal may be dissolved therein. The combination found to produce the highest intensity of Ba° and Ba⁺ resonance radiation in ground based tests involved a fuel of 16 percent $Ba(NO_3)_2$, 17 percent $BaCl_2$ and 67 percent $N_2H_4$; and as the oxidizer, the cryogenic liquid fluorine $F_2$ and in which an oxidizer to fuel weight ratio was 1.32.

Other combinations of ingredients tested are set forth in Table I below:

TABLE I

| System | Optimum O/F | Percent Ionization Calculated |
|---|---|---|
| 16.7 $BaCl_2$—83.3% $N_2H_4$/$ClF_3$ | 2.36 | 68.0 |
| 26% $BaCl_2$ —74% $N_2H_4$/$ClF_3$ | 2.08 | 70.0 |
| 50% $Ba(NO_3)_2$—50%$NH_3$/$ClF_3$ | 1.52 | — |
| 42.9% $Ba(NO_3)_2$—57.1% $N_2H_4$/$ClF_3$ | 1.19 | 50.0 |
| 16.7% $BaCl_2$—83.3% $N_2H_4$/$F_2$ | 1.95 | 68.8 |
| 26% $BaCl_2$—74% $N_2H_4$/$F_2$ | 1.71 | 70.6 |
| 21% $BaCl_2$—9% $Ba(NO_3)_2$—70% $N_2H_4$/$F_2$ | 1.57 | 68.5 |

| | | |
|---|---|---|
| 17% $BaCl_2$— 16% $Ba(NO_3)_2$—67% $N_2H_4/F_2$ | 1.31 | 68.1 |
| 13% $BaCl_2$— 21.5% $Ba(NO_3)_2$— 65.5% $N_2H_4/F_2$ | 1.34 | 63.7 |
| 9% $BaCl_2$— 30% $Ba(NO_3)_2$— 61% $N_2H_4/F_2$ | 1.04 | 63.7 |
| 42.9% $Ba(NO_3)_2$— 57.1% $N_2H_4/F_2$ | 0.976 | 43.0 |
| 42.9 % $Ba(NO_3)_2$— 57.1% $N_2H_4/OF_2$ | 0.694 | 46.9 |
| 26% $BaCL_2$— 74% $N_2H_4/OF_2$ | 1.22 | 52.8 |

The conditions under which each of the combinations listed in Table I were tested were ambient and the percentage ionization was calculated by equations set forth in NASA Contract Report CR–1415 published in August 1969.

The chemical supplier and manufacturers stated purity for the various chemicals employed are set forth in Table II below:

TABLE II

| Chemical | Supplier | Purity |
|---|---|---|
| $N_2H_4$ | Olin Mathieson Chemical Company, Lake Charles, Louisiana | Technical Grade 97–98% $N_2H_4$ (2–3% $H_2O$) |
| $NH_3$ | Air Products and Chemicals Allentown, Pa. | Technical Grade |
| $BaCl_2$ | J.T. Baker & Co. Phillipsburg, N.J. | Reagent Grade |
| $Ba(NO_3)_2$ | J.T. Baker & Co. Phillipsburg, N.J. | Reagent Grade |
| $F_2$ | Air Products & Chemicals Allentown, Pa. | 98% |
| $ClF_3$ | Allied Chemical Co. Baton Rouge, La. | 99.5% |
| $OF_2$ | Allied Chemical Co. Baton Rouge, La. | 98% |

A solubility study of various mixtures containing $Ba(NO_3)_2$, $BaCl_2$ and $N_2H_4$ was made at room temperature and is shown in the triangular plot of FIG. 2. Seven solutions that were used in the tests enumerated in Table I are indicated by reference letters in FIG. 2 as follows:

a. 16.7 percent $BaCl_2$ – 83.3 percent $N_2H_4$
b. 26 percent $BaCl_2$ – 74 percent $N_2H_4$
c. 21 percent $BaCl_2$– 9 percent $Ba(NO_3)_2$ – 70 percent $N_2H_4$
d. 17 percent $BaCl_2$ – 16 percent $Ba(NO_3)_2$ – 67 percent $N_2H_4$
e. 13 percent $BaCl_2$–21.5 percent $Ba(NO_3)_2$–65.5 percent $N_2H_4$
f. 9 percent $BaCl_2$ – 30 percent $Ba(NO_3)_2$ – 61 percent $N_2 H_4$
g. 42.9 percent $Ba(NO_3)_2$ – 57.1 percent $N_2H_4$ A mixture below the Saturation Line, that is toward the $Ba(NO_3)_2$ or $BaCl_2$ corners contained a solid and a solution phase whereas the salts were in complete solution above the saturation line.

All fuel mixtures or systems described were easily handled except the 50 percent $Ba(NO_3)_2$–50 percent $NH_3$ system. This system caused clogging of the feed valves due to precipitation of the $Ba(NO_3)_2$. In addition the light values obtained using this system was relatively low.

In testing of each of the fuel mixtures set forth in Table I the Ba° light was greater than the Ba⁺ light for a given oxidizer/fuel ratio in each of the mixtures. The maximum light occurred in all systems at a point located between the stoichiometric O/F and 3 percent less than the stoichiometric O/F. The stoichiometric O/F is defined as being equivalent to the oxidizer to fuel weight ratio in a balanced equation assuming the salt is converted to free Ba, F to HF, Cl to HCl and O to $H_2O$. For example, one system tested had an O/F ratio of 142 grams oxidizer per 100 grams fuel or 1.42/1.00. If the barium is assumed to be converted to $BaF_2$ then the stoichiometric O/F is 1.47. Since the greatest light output in all cases occurred with O/F less than stoichiometric it is apparent that little of the Ba was combined as $BaF_2$ or $BaCl_2$. This was confirmed by spectrographic analysis.

In Table II the various systems are listed in decreasing light output or relative light intensity as measured by phototubes in millivolts, thereby indicating the relative barium yield.

TABLE III

| SYSTEM (percent weight for fuel) | Maximum Relative Intensity, millivolts | |
|---|---|---|
| | Ba° 5535 A. | Ba⁺ 4554 A. |
| 17% $BaCl_2$- 16% $Ba(NO_3)_2$- 67% $N_2H_4/F_2$ | 27600 | 11800 |
| 13% $BaCl_2$- 21.5% $Ba(NO_3)_2$- 65.5% $N_2H_4/F_2$ | 23600 | 8340 |
| 21% $BaCl_2$- 9% $Ba(NO_3)_2$- 70% $N_2H_4/F_2$ | 20600 | 9100 |
| 9% $BaCl_2$-30% $Ba(NO_3)_2$-61% $N_2H_4/F_2$ | 16600 | 5970 |
| 26% $BaCl_2$-74% $N_2H_4/F_2$ | 16600 | 6520 |
| 26% $BaCl_2$-74% $N_2H_4/OF_2$ | 11800 | 2100 |
| 16.7% $BaCl_2$-83.3% $N_2H_4/F_2$ | 9100 | 3350 |
| 42.9% $Ba(NO_3)_2$-57.1% $N_2H_4/F_2$ | 9000 | 1800 |
| 42.9% $Ba(NO_3)_2$-57.1% $N_2H_4/OF_2$ | 7300 | 1330 |
| 42.9% $Ba(NO_3)_2$-57.1% $N_2H_4/ClF_3$ | 663 | 94 |
| 50% $Ba(NO_3)_2$-50% $NH_3/ClF_3$ | 221 | 44 |

From the above information, it is readily seen that the 17 percent $BaCl_2$–16 percent $Ba(NO_3)_2$–67 percent $N_2H_4/F_2$ system gave the greatest amount of light intensity of the 4,554 A Ba⁺ and 5,535 A Ba° spectral lines. Ambient tests showed that the optimum oxidizer to fuel ratio of this system was 1.32 to 1.00. This system containing 8.52 weight percent barium was estimated to be 68.1 percent ionized. Also since this system had the largest relative light intensity it would be expected to give the greatest amount of Ba° and Ba⁺ and would appear to be the optimum system for a barium payload. In all systems tested it was found that the relative light reached a maximum at the O/F corresponding to the stoichiometric equation yielding barium as one of the reaction products and that the relative light output was sensitive to the O/F. Moving to either side of the optimum O/F caused a sharp decrease in relative light.

In vacuum tests the ignition of each system tested was smooth and like the ambient tests, took place in the combustion chamber. The rapid expansion in vacuum caused a decreased atom and ion density in the luminous flame which caused the light intensity to be about one thirty-seventh to one-fiftieth the intensity measured in ambient tests. The percentage ionization was approximately the same for vacuum and ambient tests.

The operation of the invention is now believed apparent. Initially, fuel tank 11 is charged with the fuel containing the desired quantity of dissolved barium salt and pressurized with helium. The fuel tank pressure may be in the range of 6.89 to 20.06 × 10⁵ Newton/meter². Oxidizer tank 13 is also charged with the appropriate oxidizer and pressurized. Cryogenic oxidizers such as $OF_2$ and $F_2$ are condensed from gases in the closed oxidizer tank which must be maintained enclosed in a liquid nitrogen bath. The oxidizer feed valve 23 and conduit 19 must also be maintained at liquid nitrogen temperature with a liquid nitrogen jacket when employing a cryogenic oxidizer.

The noncryogenic oxidizer, $ClF_3$, may be pressurized into the closed oxidizer tank 13 from a supply bottle with super dry nitrogen.

Combustion chamber 15 is formed of stainless steel, aluminum, or the like $F_2$ compatible metals and is internally partitioned by the manifold, not shown. The conduits 17 and 19 terminate in a manifold having injector orifices (not shown) mounted 90° to each other within each end of chamber 15 and sized for pressure drops of 5.24 to $10.2 \times 10^5$ Newton/meter$^2$ across the orifice. Fuel and oxidizer flows are in the range of 2.05 to 6.82 Kg/sec each. The entire system is carried into the upper atmosphere or interplanetary space by rocket vehicle 10 where, in response to a suitable signal, timing mechanism or the like, valves 21 and 23 may be selectively opened and closed and the pressurized liquid fuel and oxidizer will flow through conduits 17 and 19 into combination unit 15. When the hypergolic liquids impinge upon each other, they spontaneously ignite to expel reaction product gases or plasma including the highly luminous barium neutral atoms and barium ions as individual species. All of the barium reaching the combustion chamber is vaporized and released through the opposite ends thereof so that a high yield efficiency is obtained. The resulting high flame temperature, approximately 4,000° K., and some as yet not determined chemical activation, produces a relatively large amount of barium ions in the flame which is a highly desirable condition. It has been estimated from spectroscopic measurements that the degree of ionization may be as high as 75 percent in the released plasma in comparison to being on the order of 1 percent for the previously used Ba-CuO solid system which depends almost entirely on solar photoionization, a time-dependent phenomena which further reduces the usable barium yield of this known system.

Thus, it is readily apparent that the present invention provides an inherently more efficient process of producing barium clouds wherein the degree of ionization in the released plasma is much greater. The selectively opening and closing of valves 21 and 23 gives the possibility of a payload with multiple releases permitted due to the start and stop capabilities of the liquid system. Also, the liquid system of the present invention gives the possibility of controlling rates so that a trail-type release can be obtained as well as a point-source type. In addition, the liquid system of the present invention effects the formation of barium atoms and ions at the time of combustion and expansion at high temperatures and results in little opportunity for the barium to condense during release.

There are obviously many variations and modifications to the present invention that will be readily apparent to those skilled in the art without departing from the spirit or scope of the disclosure or from the scope of the claims.

What is claimed as new and desired to be secured by Letters Patent of the United States is:

1. A method of releasing a good yield of free barium atoms and barium ions in a gaseous medium comprising the steps of:
    dissolving a barium salt selected from the group consisting of $BaCl_2$, $Ba(NO_3)_2$ and a mixture of $BaCl_2$ and $Ba(NO_3)_2$ in a liquid fuel selected from the group consisting of hydrazine and liquid ammonia,
    providing a liquid oxidizer selected from the group consisting of $OF_2$, $F_2$ and $ClF_2$ for the fuel,
    releasing the liquid fuel containing the barium salt simultaneously with releasing the liquid oxidizer so that the two released liquids contact each other whereby a hypergolic reaction takes place to release a high yield of luminous barium atoms and barium ions in the resulting flame.

2. The method of claim 1 wherein the liquid fuel comprises:
    a fuel mixture consisting of 67 percent $N_2H_4$, 17 percent $BaCl_2$ and 16 percent $Ba(NO_3)_2$, by weight, and the oxidizer is a fluorine oxidizer.

* * * * *